United States Patent [19]

Howard et al.

[11] Patent Number: 5,227,345

[45] Date of Patent: Jul. 13, 1993

[54] POWDER MIXTURES INCLUDING CERAMICS AND METAL COMPOUNDS

[75] Inventors: Kevin E. Howard; David J. Magley, both of Midland, Mich.

[73] Assignee: The Dow Chemical Company, Midland, Mich.

[21] Appl. No.: 518,379

[22] Filed: May 3, 1990

[51] Int. Cl.$^5$ .................... C04B 35/56; C04B 35/58
[52] U.S. Cl. .......................... 501/94; 501/87; 501/88; 501/96; 428/404; 428/564; 428/565
[58] Field of Search ............. 501/87, 88, 94, 96; 428/404, 564, 565

[56] References Cited

U.S. PATENT DOCUMENTS

| | | | |
|---|---|---|---|
| 3,718,441 | 2/1973 | Landingham | 29/182.1 |
| 4,029,000 | 6/1977 | Nakamura et al. | 501/87 X |
| 4,279,654 | 7/1981 | Yajima et al. | 501/98 X |
| 4,379,852 | 4/1983 | Watanabe et al. | 501/87 |
| 4,605,440 | 8/1986 | Halverson et al. | 75/238 |
| 4,704,250 | 11/1987 | Cline et al. | 419/15 |
| 4,705,761 | 11/1987 | Kosugi | 501/87 |
| 4,718,941 | 12/1988 | Halverson et al. | 75/236 |
| 4,814,128 | 3/1989 | Lieberman et al. | 264/65 |
| 4,816,428 | 3/1989 | Kishi et al. | 501/89 |
| 4,834,928 | 5/1989 | Su | 501/12 X |
| 4,904,623 | 2/1990 | Petzow et al. | 501/87 X |
| 4,952,532 | 8/1990 | Isozaki et al. | 501/87 |
| 4,957,884 | 9/1990 | Knudsen et al. | 501/87 |
| 4,990,371 | 2/1991 | Dutta et al. | 427/255.7 X |

Primary Examiner—Karl Group

[57] ABSTRACT

Novel, hot pressed metal-ceramic mixtures provide increased density, hardness, and flexural strength in comparison with pure densified ceramics.

5 Claims, No Drawings

POWDER MIXTURES INCLUDING CERAMICS AND METAL COMPOUNDS

BACKGROUND OF THE INVENTION

1. Field of the Invention

This invention relates to densified ceramic-metal compounds.

2. Description of the Prior Art

Ceramic materials are currently being investigated for use in high stress applications such as light weight armor tiles, and other applications that require a high wear resistance, such as water jet nozzles. Improved properties in such ceramic materials are necessary if the ceramics are to be used in such applications. Because of the high hardness of boron carbide, it is often selected for use in such applications. In order for boron carbide to be used successfully in applications requiring high wear resistance and armor applications, the hardness and toughness of boron carbide must be improved.

One approach to the improvement of ceramics is the blending of the ceramic with a metal to form a composite. Most of the work which has been conducted utilizing composites of boron carbide and metals utilize high proportions of the metal component which have resulted in reducing the hardness of the ceramic. For instance, in U.S. Pat. No. 4,704,250 there is described a process for preparing low density cermets (metal-ceramic) articles by utilizing more than 5 to about 25% by volume of titanium metal in combination with boron carbide particles. Consolidation can take place at about 1,000 degrees centigrade. Cermets are produced by the process of this patent which have densities nearly the same as densified boron carbide, nearly zero porosity, and improved toughness. In the process of this patent, the metal is admixed with the boron carbide in the form of a metal hydride.

Boron carbide based composites obtained by hot pressing and stress-relief are disclosed as the result of utilizing a complex metallic binder in *Poroshk. Metall. (Kiev)*, (8), 66–70 (1988). Watanabe et al in *Modern Developments in Powder Metallurgy*, Vol. 14, pages 373 to 385 (1981) disclose metal boride additives useful to improve the density, transverse rupture strength, and Vickers hardness of titanium boride-cobalt boride sintered articles. Prior to sintering, the metal borides were ball milled to provide an intimate mixture with the ceramic powder. Kang et al in *Journal of the American Ceramic Society*, 72 (10) 1868–1872 (1989) disclose titanium diboride having increased sintering density by the use of a combination of 0.5% by weight iron powder and boron carbide additives.

In U.S. Pat. No. 4,718,941 and U.S. Pat. No. 4,605,440, Halverson et al describe boron carbide-aluminum composites wherein a porous ceramic precursor is infiltrated utilizing molten aluminum. Chemical treatment of the boron carbide is described in U.S. Pat. No. 4,718,941. The boron carbide is washed in a polar solvent such as an alcohol, an ester, or other polar organic solvent in order to remove boron oxide from the surface of the boron carbide. This treatment is said to render the boron carbide more amenable to infiltration by the molten metal. A typical washing process for boron carbide with an alcohol or ester or other polar organic solvent involves exposure of the boron carbide to the organic solvent for a few hours to a few days or longer. In U.S. Pat. No. 4,605,440, boron carbide-reactive metal cermets are disclosed which are produced by hot pressing to make composites having full (theoretical) density by co-dispersing the boron carbide and reactive metal powders utilizing solvents or solvents and surfactants. The use of either polar or non-polar solvents and any of anionic, cationic, nonionic, or amphoteric surfactants is disclosed.

Cermets are disclosed in U.S. Pat. No. 3,718,441 which have nearly theoretical density. Subsequent to removal under vacuum of the oxide film on the surface of the ceramic, the metal upon consolidation, using heat and pressure, flows freely into the void spaces of the ceramic. Boron carbide, aluminum oxide, and beryllium oxide in combination with a metal having a density of less than 9 grams per cubic centimeter, such as aluminum, magnesium, nickel, and chromium, are disclosed as useful in the preparation of the cermets.

SUMMARY OF THE INVENTION

There are disclosed a ceramic-metal article, a process for the preparation of a heat and pressure densified ceramic-metal article, and a novel precursor mixture of a metal oxide and a ceramic precursor utilized in the formation of ceramic-metal densified articles. The densified articles of the invention have increased density, hardness, and flexural strength, in comparison with similarly densified pure ceramics. Densification of the ceramic-metal articles can be accomplished, for instance, utilizing hot pressing or hot isostatic pressing. The metal oxide-ceramic precursor mixtures are prepared by exposing a ceramic material in finely powdered form to an organometallic or inorganic metal compound dissolved in a solvent therefor. Subsequently, the solvent solution of the organometallic or inorganic metal compound and the ceramic powder mixture is, optionally exposed to an oxidizing agent, thereby converting the organometallic compound to the metallic oxide. Thereafter, the solvent is removed and the mixture densified by the application of heat and pressure. Liquid phase sintering of the ceramic can take place during densification when certain metals are present in the mixture.

DETAILED DESCRIPTION OF THE INVENTION AND THE PREFERRED EMBODIMENTS

It has been found, as disclosed in U.S. copending application of Ronald J. Hoffman et al, Ser. No. 250,578, filed Sep. 29, 1988, now U.S. Pat. No. 5,021,368 that ceramic-metal intercalation compounds can be formed by reacting a ceramic material in finely powdered form with a low dielectric solvent solution of an organometallic compound or a metal ion present in the gaseous phase. Alternatively, the ceramic-metal compounds disclosed in this copending application can be prepared by forming the ceramic powder into such a shape as to permit its use as an electrode in an electrochemical cell and using the electrode as the cathode of the cell. An aqueous or non-aqueous electrolyte can be utilized in such a cell. Densified ceramic-metal articles prepared utilizing the ceramic-metal intercalation compounds disclosed by Hoffman et al, said densification being effected by hot pressing, hot isostatic pressing, or sintering, provide densified articles having at least one of increased density, hardness, and toughness.

Prior art cermets are densified mixtures of ceramics and metals. These can be sintered or hot pressed and combine the ductility and thermal shock resistance of metals with the refractory qualities of ceramics. The metal serves as a binder for the high-refractory ceramic particles, increasing the thermal conductivity and shock resistance of the ceramic. This latter property imparts a high temperature strength to the cermet that is nearly equal to that of the pure ceramic. All refractory carbides, borides, oxides, as well as certain silicides and sulfides, can be used as ceramic ingredients for cermet manufacture. As metals, iron, chromium, nickel, cobalt, aluminum, and molybdenum, as well as alloys of one or more metals with these metals can be used. Prior art cermets are usually fabricated by powder metallurgy techniques. The properties of the cermet depend upon the ratio of ceramic to metal as well as the particle size of the powder, the surface tension, and the wetting characteristics of the metal utilized. Some cermets are made by impregnating a porous mixture with a metallic binder. Prior art cermets contain about 80% of a ceramic material and about 20% of a metal. Cermets are used in various applications in which high-temperature and improved shock resistance are required, as in rocket and jet engine parts, spinning tools for hot metals, hot-forging dies, and similar applications. Typical prior art cermets are illustrated by the following combinations of ceramic and metal: boron carbide and aluminum; zirconium carbide and iron; titanium carbide and cobalt; molybdenum carbide and cobalt; tungsten carbide and cobalt; chromium carbide and nickel; molybdenum boride and nickel or nickel-chromium; magnesium oxide and nickel; and aluminum oxide and chromium.

The prior art cermet compositions of most significance for practical or potential applications are based upon carbides. These exhibit properties of high-temperature strength and great hardness such as the titanium carbide/nickel cermets. The oxide-base cermets also have valuable high strength properties at high temperatures and are reasonably stable in air. The most extensively investigated and the only commercially available oxide-base cermets are mixtures primarily composed of aluminum oxide and chromium suitably alloyed to give useful high temperature properties. During sintering, the metal phase is usually in the liquid state and completely wets and flows between the particles of the ceramic, forming a thin film of metal.

Studies have shown, in prior art cermets, that for densification to take place rapidly during sintering, it is essential to have an appreciable amount of the liquid phase metal present. In addition, it is necessary to select a metal exhibiting an appreciable solubility in the ceramic material and which is capable of wetting the ceramic easily. Thus, the driving force for densification during sintering of the ceramic is derived from the capillary pressure of the liquid phase metal, which is located between the particles of the ceramic. Densification by way of capillary pressure results in several different processes, which occur simultaneously. On formation of a liquid metal phase, there is a rearrangement of the particles of the ceramic to give a more effective packing. This process can lead to complete densification if the volume of liquid present is sufficient to fill in the interstices completely. In addition, at contact points where there are bridges between particles, high local stresses lead to plastic deformation and creep, which allow a further rearrangement. During the sintering process, a solution of smaller particles and growth of larger particles by material transfer through the liquid phase occurs. Because there is a constantly imposed capillary pressure, additional particle rearrangement can occur during grain-growth and grain-shape changes to give further densification. In situations in which the liquid metal penetrates between particles, the increased pressure at the contact points leads to an increased solubility, such that there is material transfer away from the contact areas, so that the particle centers approach one another and shrinkage, i.e., densification results.

In the hot pressing method of densification, densification occurs as the result of externally applied pressure at elevated temperature rather than relying entirely upon capillary pressure. The hot pressing densification process is desirable in that it eliminates the need for a very fine particle material and also removes large pores caused by non-uniform mixing. An additional advantage is that in some cases densification can be obtained at a temperature at which extensive grain growth or secondary recrystallization does not occur. Since the mechanical properties of many ceramic systems are maximized with high density and small grain size, optimum properties can be obtained by hot pressing techniques.

One of the main reasons that prior art ceramics are not used more widely in many applications is the fact that they fail when subjected to sufficient stress with "glass like" brittle fracture. In addition, they do not normally exhibit appreciable plastic deformation and their impact resistance is low. Therefore, the use of a ceramic for many structural uses is limited by these relatively poor (in comparison with metals) mechanical properties.

It is an object of the present invention to increase at least one of the density, flexural strength, and the hardness of ceramic materials by the use of precursor mixtures of metal compounds and a ceramic. Unexpectedly, the use of small amounts of metal compounds admixed with a ceramic, generally up to about 3% by weight of metal compound based on the total weight of the mixture, provides the desired improved properties in the densified metal-ceramic articles of the invention.

The use of the precursor mixtures of this invention to form densified articles overcomes a particularly troublesome unevenness of mixing problem encountered in the formation of precursor mixtures of prior art cermets. The cermet compositions of the prior art are generally made by the crude mixing of metal particles with a ceramic powder. Usually this method produces a very non-uniform dispersion of the metal particles. By the introduction of chemical surfactants into the prior art ceramic-metal composition, greater uniformity of dispersion can be obtained. Specific surfactants are required for a particular ceramic and metal powder. The degree of uniformity for a dispersion is limited by the particle size of the powders utilized. Another prior art method of mixing a ceramic with a metal powder is by the co-precipitation of the metal, such as a metal oxide with a ceramic material, usually a soluble metal oxide. This technique results in a more uniformly dispersed metal compound having a particle size on the order of 100–500 angstroms. The use of this technique is limited to soluble metal oxide-ceramics and some other metal compounds. All of these prior art mixtures of metals and ceramics fail to provide the fineness of dispersion of precursor mixtures of a metal compound and a ceramic obtained by the process of the invention.

The precursor mixtures of the invention, which are useful in the preparation of cermets, are further distinguished from each of these compositions of the prior art in that the inventive, precursor mixtures generally contain a metal in organometallic or inorganic metal compound form. The exposure time of the ceramic powder to a solvent solution of the organometallic compound can be very brief, it only being necessary to maintain contact of the components of the mixture for a time sufficient to provide a homogeneous mixture. Subsequently, the organic portion of the organometallic compound can be, optionally, removed from the metal compound by the addition of an oxidizing agent or by thermolysis and, thereafter, the homogeneous mixture, which can be characterized as a suspension, is treated so as to remove the solvent. Generally, mixing is accomplished at ambient or elevated temperature and pressure. Preferably, mixing takes place at ambient temperature and pressure. Thereafter, the mixture is air dried at moderately elevated temperatures, such as, about 50 to about 100 degrees centigrade, to insure that volatile materials are removed from the mixture.

It is noted that compounds described as useful in the preparation of cermets by hot pressing in co-pending Hoffman et al application, Ser. No. 250,578, filed Sep. 29, 1988, require long periods of exposure of a ceramic powder to an ionizable organometallic compound dissolved in a low dielectric solvent. The long, required reaction times, on the order of 100 to 150 hours, at ambient temperature and pressure, which are required to obtain intercalation of the ionized metal of the organometallic compound, distinguish the mixtures of the present invention from the ceramic- metal compounds of Hoffman et al. In addition, it is noted that in the infiltration processing of a molten metal into boron carbide, as described in U.S. Pat. No. 4,718,941, the starting constituents (for instance, boron carbide and an alcohol or ester) are mixed as long as necessary to change the surface chemistry of the ceramic. Typically, exposure of the ceramic to the solvent for a few hours to a few days or even longer is required, as described in column 7 thereof. It is further noted that the organic solvent utilized in '941 to change the surface chemistry of the precursor for use in further processing contains no organometallic compound.

In the process of the invention, the solvent deposited organometallic or inorganic metal compound is utilized in combination with a ceramic powder. Up to about three percent by weight of metal, based upon the final mixture, is deposited on the surface of the ceramic present in the amount of up to about 97% by weight. Preferably, about 0.1% to about 2.5% by weight of metal is deposited on said ceramic powder, and, most preferably, about 0.3% to about 1.5% by weight of metal, all based upon the final mixture, is deposited on said ceramic powder. The densified ceramic-metal articles of the invention can be made utilizing a ceramic-metal precursor mixture in which the metal present is selected from the metals of Groups 1a, 1b, 2a, 2b, 3a, 3b, 4a, 4b, 5a, 5b, 6a, 6b, 7a, 7b, and 8 of the Periodic Table of the Elements. The Periodic Table of the Elements referred to above is that which is published in the 52nd edition of the Handbook of Chemistry and Physics, Chemical Rubber Company (1971-1972).

A wide variety of organometallic and inorganic complexes are available in which the organic portion thereof is selected so as to provide solubility in an organic solvent. Representative organometallic and inorganic compounds are chromium acetylacetonate, bis [($n^5$-cyclopentadienyl) molybdenum tricarbonyl], dimolybdenum tetraacetate, dichromium tetraacetate, cyclopentadienyl molybdenum tricarbonyl, dicyclopentadienyl nickel, dicyclopentadienyl iron, bis (cyclopentadienyl iron dicarbonyl) butyl magnesium, dicyclopentadienyl cobalt, bis (triphenylphosphine) copper (I) borohydride, tetraphenyl lead, diphenyl mercury, bis (cyclopentadienyl) nickel, bis (cyclopentadienyl) chromium, dicyclopentadienyl ruthenium, trimethyl aluminum, triphenyl antimony, and mixtures thereof.

Representative organic solvents for use in solubilizing the organometallic compounds useful in the preparation of the precursor mixtures of metal and ceramic powders are as follows: toluene, methylene chloride, chloroform, alcohols having up to about 5 carbon atoms, such as, methyl, ethyl, propyl, isopropyl, butyl, isobutyl, secondary butyl, normal butyl, and pentyl alcohols. Also useful are esters such as, methyl acetate, methyl acetylacetate, or methyl acetylsalicylate, methyl benzoate, methyl butyrate, methylcarbitol, methylcarbonate, methylcellosolve, and methylcellosolve acetate. In addition, solvents such as the reaction product of an alcohol with an aldehyde, and glycerol, 1, 2, 3-propane triol, glycerin, or trihydroxypropane can be used as well as any glycerol derivative such as glyceraldehyde, glyceric acid, glycerol formals, and glycidol. Generally, organic solvents are useful, preferably, mixtures of polar and non-polar organic solvents, and most preferably, polar solvents are useful.

In the process of the invention for the preparation of the metal-ceramic powder mixtures, it is optional to treat the dispersion of ceramic powder and organometallic or inorganic metal compound in a solvent, with an oxidizing agent subsequent to the attainment of a homogeneous mixture. The oxidizing agent is used to convert the organometallic compound to the metal oxide. While treatment with an oxidizing agent of the metal compound and ceramic mixture is desirable with certain metals, it is unnecessary to achieving the desired results in the densified metal-ceramic articles. Useful oxidizing agents include but are not limited to, alkali metal hypochlorites, organic and inorganic peroxides and carbon tetrachloride.

The mixtures of a metal oxide and a ceramic powder of the invention can be prepared utilizing an organometallic or inorganic metal compound, present in a solvent at a concentration by weight (based upon the total weight of the mixture) of about 0.5% to about 20%, preferably, about 1% to about 15%, and, most preferably, about 2% to about 10%. The concentration of organometallic or inorganic metal compound is not believed to be critical to the uniform deposition of the metal, from a solvent solution, upon the surface of the ceramic powder. The ranges of concentration of the organometallic compound in the solvent are given merely to illustrate the desired ranges to obtain a reasonable deposition rate of the organometallic compound on the ceramic powder. The deposition of the organometallic compound on the ceramic powder can take place at ambient temperature or above up to about the boiling point of the solvent utilized. The temperature of the mixture is not believed critical to obtaining the required deposition of the organometallic compound upon the ceramic powder.

Useful ceramic powders are exemplified by, but are not intended to be limited by, the following listing of types of ceramic materials: borides, nitrides, carbides, silicides, phosphides, arsenides, and metal alloys thereof. Representative carbides are selected from the group consisting of boron carbide, titanium carbide, silicon carbide, and mixtures thereof. Representative borides are selected from the group consisting of titanium diboride, zirconium diboride, niobium diboride, and mixtures thereof. Representative nitrides are selected from the group consisting of boron nitride, aluminum nitride, silicon nitride, and mixtures thereof.

Ceramic articles prepared in accordance with the process of the invention are considered to have improved properties with respect to hardness and flexural strength, as well as the attainment of theoretical density, as the result of hot pressing. As previously indicated, the metal deposited on the surface of the ceramic article is, optionally, in the form of the metal oxide. However, even without treatment of the metal compound, deposited on the surface of the ceramic, with an oxidizing agent, the oxide of the metal may be formed during heating upon densification. During the heating process leading to densification, the metal oxide is subsequently converted to a metal ceramic phase (boride, nitride, carbide, silicide, phosphide, arsenide, or metal alloys thereof). Generally, the densification process is conducted in a resistance heated furnace, such as one having a molybdenum or graphite element. A high purity inert, argon atmosphere is utilized during the densification process. Maximum temperatures employed during densification, under said inert atmosphere conditions are, typically, 2,000 degrees centigrade to 2,100 degrees centigrade.

This invention is the outgrowth of studies of the effect upon densification of boron carbide and other ceramics having deposited on the surface thereof various metals in much smaller amounts than is conventional in the preparation of cermets. By the use of ceramic-metal mixtures containing up to about 3% by weight, based upon the total weight of the ceramic and metal, it has been found that a density of 2.52 grams per cubic centimeter can be obtained even when the ceramic-metal compounds are hot pressed at lower hot pressing temperatures than those conventionally used to form densified articles from boron carbide. In addition, the ceramic-metal hot pressed articles of the invention are characterized by increased hardness and flexural strength, as compared to densified pure boron carbide and other ceramic articles made under the same processing conditions, where no added metal is present upon the surface thereof.

In the formation of densified ceramic-metal articles by the process of the invention, a mixture comprising the powdered ceramic-metal mixture of the invention is consolidated, for instance, by hot pressing or by hot isostatic pressing to produce a shaped article. In this process, the ceramic-metal compacted material is slowly heated and held at a desired temperature for at least the length of time needed to achieve densification. The densified body is then permitted to cool. The ceramic-metal material may contain impurities which will react chemically at elevated temperature to inhibit densification or to degrade the system which results in an undesirable product. In such cases, a sufficiently rapid rate of heating can be applied such that the rate of densification is faster than the rate at which the unwanted chemical reaction occurs. The heating rate can exceed a rate of about 100 degrees centigrade per minute, in accordance with the rapid rate densification of ceramics described in U.S. Pat. No. 4,490,319. Current commercial practice, generally, couples very slow heating rates with long periods of holding at the densification temperature.

The following examples illustrate the various aspects of the invention but are not intended to limit its scope. Where not otherwise specified throughout this specification and claims, temperatures are given in degrees centigrade and parts, percentages, and proportions are by weight. The examples will show the preparation of ceramic-metal compound mixtures, which are useful in the formation of ceramic-metal articles by hot pressing.

In the following examples, generally, a boron carbide, or other ceramic powder having an average particle size of about 2 micrometers, is mixed with an organometallic compound, prepared by dissolving about 10 grams (5% by weight) of the organometallic compound in 200 milliliters of an organic solvent comprising a polar solvent. The boron carbide or other ceramic in the amount of about 200 grams is, thereafter, slowly added to the solution of organometallic compound to form a premix. After about 10 minutes to 60 minutes of stirring the mixture to insure a homogeneous mixture, the organic solvent is removed, such as by using a stream of compressed air and, after drying the mixture at a temperature of about 50 to 120 degrees centigrade, soft agglomerates, which are formed in the powder, are broken up. This powder composition premix has a higher concentration of metal to ceramic than as is desirable in the end product mixture and, therefore, the premix is blended with an additional amount of boron carbide or other ceramics, for instance, 800 grams of additional boron carbide to provide a final composition containing 1% by weight organometallic compound, based upon the total weight of the mixture. Ordinarily, the mixing of the premix with the additional ceramic powder is accomplished utilizing a ball mill. Alternatively, ball milling can be eliminated by blending the organometallic compound with the ceramic using simple stirring techniques.

The hot pressing of the ceramic powder mixtures of the invention can be accomplished utilizing a constant heating rate so as to eliminate the heating rate as a variable which must be taken into consideration in the evaluation of the final cermet composition. Laboratory experimental procedure involves the use of press dies measuring 2 inches by 1.5 inches (5.1 cm by 3.8 cm). These dies are generally loaded with 94 grams of ceramic powder and pre-pressed at a pressure of 1666 pounds per square inch prior to final hot pressing. During hot pressing, the temperature is maintained between 2,000 to 2,200 degrees centigrade using an applied pressure of 5,000 pounds per square inch, which is initially applied at about 1,850 degrees centigrade.

EXAMPLE 1

A boron carbide composite containing 0.35 weight percent molybdenum, based upon the total weight of the mixture, was hot pressed for 30 minutes at a temperature of about 2,100 degrees centigrade. The precursor mixture used to prepare the composite was prepared as follows:

A methanol solution of 5% by weight of the organometallic complex bis [($n^5$-cyclopentadienyl) tricarbonyl molybdenum] was prepared as described above and the boron carbide powder, identified under the tradename ESK-1500, in the amount described above was added to the stirred, red solution of the organometallic molybdenum compound. After stirring the mixture for one hour, slowly evaporating the methanol solvent, and breaking up the soft agglomerates which are formed, an additional 800 grams of boron carbide having an average particle size of about 2 micrometers, was added by ball milling to give a final composition containing 0.35 weight percent molybdenum based upon the total weight of the mixture.

The molybdenum-boron carbide mixture was confirmed as containing 0.35 weight percent molybdenum by neutron activation analysis. The hot pressed molybdenum-boron carbide mixture provided a densified article having a density of 2.53, a Vickers microhardness value of greater than 4,200 (plus or minus 200) kilograms per square millimeter, and a flexural strength of 410 (plus or minus 90) $^{MPa}$.

EXAMPLE 2

Control Forming No Part of This Invention

Utilizing the same boron carbide powder and hot pressing under the conditions of Example 1, a density of 2.52, a Vickers microhardness of 3,417 (plus or minus 255) kilograms per square millimeter, and a flexural strength value of 370 (plus or minus 129) $^{MPa}$ was obtained.

EXAMPLE 3

Example 1 was repeated except that the hot press temperature was varied. Temperatures of 2,000, 2,050, 2,075, 2,100 and 2,200 degees centigrade were used. In all experiments, a 30 minute hot pressing time schedule was held constant, except in hot pressing, at 2,200 degrees centigrade. At 2,200 degrees centigrade, the hot pressed ceramic mixture was maintained at this temperature for only 10 minutes. The density of the ceramic articles produced as a function of hot pressing temperature is as follows: at 2,000 degrees centigrade, the density was 2.27; the density at a hot pressing temperature of 2,050 was 2.45; the density at a hot pressing temperature of 2,075 was 2,50; and the density of samples hot pressed at 2,100 degrees and 2,200 degrees centigrade were fully dense (2.52 grams per cubic centimeter).

EXAMPLE 4

Control, Forming No Part of This Invention

A sample of boron carbide having an average particle size of about 2 micrometers and sold under the tradename ESK-1500 was dry mixed by ball milling with molybdenum metal having a particle size of 20 micrometers at a concentration (based upon the total weight of the metal and boron carbide powder) of 0.34 weight percent. Thereafter, the specimen was hot pressed at 2,100 degrees centigrade for 30 minutes. The Vickers microhardness average value was found to be considerably lower than the value obtained in Example 1. The dry mixed molybdenum metal-boron carbide sample provided a Vickers microhardness of 3,496 (plus or minus 192) kilograms per square millimeter, as compared to a repeat sample of Example 1 which showed a Vickers microhardness of 4,198 (plus or minus 194) kilograms per square millimeter. Similarly, the flexural strength of the dry mixed molybdenum metal and boron carbide powder sample was reduced on the order of about 25% in comparison with a repeat hot pressed composition of Example 1. The molybdenum metal-boron carbide control sample provided a flexural strength of 314 (plus or minus 25) MPa in comparison with a repeat of Example 1 which yielded a flexural strength of 442 (plus or minus 80) MPa.

EXAMPLE 5

The general procedure described above for the preparation and processing of boron carbide articles was used but instead of utilizing 5% by weight of an organometallic complex, 2.5% by weight of cyclopentadienyl titanium dichloride and 0.25% by weight of cyclopentadienyl iron dicarbonyl were dissolved in a blend of equal parts of methanol and chloroform. Two hundred grams of boron carbide powder were added thereto in accordance with the general procedure described above, and subsequently, an additional 800 grams of the boron carbide powder described above, was blended therewith prior to hot pressing the mixture at 2,100 degrees centigrade for 30 minutes. A density of 2.52 grams per cubic centimeter was obtained. In comparison with a hot pressed sample of pure boron carbide, utilized as a control, the Vickers microhardness and flexural strength were found to be essentially the same. It is considered that varying amounts of the transition metal-derived phases, present together with the boron carbide, are required to develop optimum hardness and flexural strength values, as compared with pure boron carbide hot pressed articles.

EXAMPLES 6-8

The general procedure described above for the preparation of the mixtures of organometallic compound and boron carbide were utilized, except that the organometallic compound was, subsequent to deposition on the ceramic, oxidized by the addition to the solvent solution of sodium hypochlorite. In Examples 6-8, the inorganic compound utilized was chromium acetylacetonate. The hot pressing time conditions were also similar to that described above. The specimens were hot pressed at a temperature of 2,100 degrees centigrade. Utilizing chromium levels, based upon the total weight of the ceramic and metal, of 0.34%, 0.75%, and 1.2% by weight, respectively, in Examples 6-8, all hot pressed articles were found to be fully dense at a density of 2.52 grams per cubic centimeter. The Vickers microhardness values obtained on hot pressed articles of Examples 6-8 show values of about 3,425 kilograms per square millimeter, for Example 6, containing 0.34 weight percent chromium; a Vickers microhardness of 3,525 kilograms per square millimeter for the Example 7, containing 0.75 percent by weight chromium; and a Vickers microhardness of about 3,380 kilograms per square millimeter for Example 8 containing 1.2% by weight chromium. A control containing only pure boron carbide had a Vickers microhardness of 3,290 kilograms per square millimeter.

EXAMPLES 9-21

Example 1 is repeated utilizing in turn, instead of the organometallic molybdenum compound, the following organometallic compounds: dicyclopentadienyl chromium, dicyclopentadienyl nickel, dicyclopentadienyl iron, butyl magnesium, dicyclopentadienyl cobalt, bis (triphenylphospine) copper (I) borohydride, tetraphenyl lead, diphenyl mercury, bis (cyclopentadienyl) nickel, bis (cyclopentadienyl) chromium, dicyclopentadienyl ruthenium, trimethyl aluminum, and triphenyl antimony. Upon densification, results similar to those of Example 1 are obtained.

EXAMPLES 22-26

Example 1 is repeated substituting in turn titanium carbide and silicon carbide for the boron carbide of Example 1. Increased density and hardness is obtained in hot pressed ceramic metal composites. Additionally, substituting for the boron carbide of Example 1, boron nitride, aluminum nitride, and silicon nitride, increased density and hardness are obtained in hot pressed articles formed utilizing a mixture of an organometallic compound with the above ceramics.

EXAMPLE 27-29

Example 1 is repeated substituting for the boron carbide of Example 1, titanium boride, zirconium boride, and neodymium boride. Increased density and hardness are obtained in hot pressed compositions containing an organometallic compound mixture with said ceramic.

While this invention has been described with respect to certain specific embodiments, it will be recognized by those skilled in the art that many variations are possible without departing from the scope and spirit of the invention and it will be understood that it is intended to cover all changes and modifications of the invention disclosed for the purpose of illustration which do not constitute departures from the spirit and scope of the invention.

The embodiments of the invention in which an exclusive property or privilege is claimed are defined as follows:

1. A powder mixture consisting essentially of a powdered ceramic and a metal compound deposited thereon, wherein said metal compound is dissolved in an organic solvent, mixed with said ceramic, and said solvent is removed to form said powder mixture, said metal compound is selected from the group consisting of bis ($n^5$-cyclopentadienyl) molybdenum tricarbonyl, cyclopentadienyl molybdenum tricarbonyl, dicylopentadienyl nickel, dicyclopentadienyl iron, dicyclopentadienyl cobalt, bis (triphenylphosphine) copper (I) borohydride, tetraphenyl lead, diphenyl mercury, bis (cyclopentadienyl) nickel, dicyclopentadienyl ruthenium, triphenyl antimony, chromium acetylacetonate, dimolybdenum tetraacetate and mixtures thereof and wherein said metal compound is present in the amount of up to about 3% by weight.

2. The powder mixture of claim 1, wherein said ceramic is selected from the group consisting of at least one of carbides, nitrides, silicides, borides, phosphides, and arsenides.

3. The mixture of claim 1, wherein said organic solvent comprises a polar, organic solvent selected from the group consisting of at least one of an alcohol, an ester, and the reaction product of an alcohol and an aldehyde.

4. The mixture of claim 3, wherein said ceramic is selected from the group consisting of boron carbide, silicon carbide, titanium diboride, zirconium diboride, and niobium diboride and said organic solvent is methanol or a mixture of methanol and chloroform.

5. The mixture of claim 4, wherein said ceramic is boron carbide, said polar, organic solvent is methanol, and said metal compound is bis ($n^5$-cyclopentadienyl) tricarbonyl molybdenum or chromium acetylacetonate.

* * * * *